(12) United States Patent
Casement et al.

(10) Patent No.: US 10,808,896 B2
(45) Date of Patent: Oct. 20, 2020

(54) T-BAR LIGHTING ASSEMBLY

(71) Applicant: Aron Lighting LLC, Conshohocken, PA (US)

(72) Inventors: Josh Casement, Salem, NH (US); Clay Mohrman, Duxbury, MA (US); Jeffrey Corvese, Cumberland, RI (US); Terence Yeo, Boston, MA (US); Timothy Kelly, Brookline, MA (US)

(73) Assignee: ARON Lighting LLC, Conshohocken, PA (US)

( * ) Notice: Subject to any disclaimer, the term of this patent is extended or adjusted under 35 U.S.C. 154(b) by 0 days.

(21) Appl. No.: 14/986,565

(22) Filed: Dec. 31, 2015

(65) Prior Publication Data

US 2017/0082252 A1    Mar. 23, 2017

Related U.S. Application Data

(60) Provisional application No. 62/099,089, filed on Dec. 31, 2014.

(51) Int. Cl.
*F21V 7/04* (2006.01)
*F21S 8/02* (2006.01)
(Continued)

(52) U.S. Cl.
CPC .............. *F21S 8/026* (2013.01); *E04B 9/067* (2013.01); *E04B 9/18* (2013.01); *F21S 8/061* (2013.01); *F21V 15/013* (2013.01); *F21V 21/008* (2013.01); *F21V 21/049* (2013.01); *G02B 1/045* (2013.01); *G02B 6/0038* (2013.01); *G02B 6/0041* (2013.01); *G02B 6/0046* (2013.01); *G02B 6/0051* (2013.01);
(Continued)

(58) Field of Classification Search
CPC ........... F21S 8/026; F21S 8/061; E04B 9/067; E04B 9/18; E04B 9/006; G02B 6/0055; G02B 6/0046; G02B 6/0051; F21V 21/049; F21V 21/008; F21V 15/013; F21Y 2115/10
USPC .. 362/606, 147, 223, 217.03, 217.05, 217.1, 362/217.14, 364, 367, 368
See application file for complete search history.

(56) References Cited

U.S. PATENT DOCUMENTS 3,078,366 A  *  2/1963  Winkler .................... F21S 8/02
                                                  292/114
3,502,860 A  *  3/1970  Boake ................. F21V 33/0088
                                                  362/224
(Continued)

FOREIGN PATENT DOCUMENTS

EP           2650599 A1 * 10/2013  .............. F21S 8/026

*Primary Examiner* — William J Carter
*Assistant Examiner* — Omar Rojas Cadima
(74) *Attorney, Agent, or Firm* — Duane Morris LLP

(57) ABSTRACT

A lighting assembly is provided which comprises a light fixture in combination with a support grid such as a drop ceiling t-bar. The light fixture can be configured to use a t-bar as the main form of support. The light fixture can be push-fit onto a t-bar or use a clip to join two or more portions of the light fixture to an installed t-bar. Once attached to the T-bar, the light fixture itself can provides support for a ceiling tile. Various embodiments are provided which achieve a variety of light distributions useful in typical illumination applications. Both recessed and suspended fixture types are achieved in various embodiments which are particularly well suited for LED lighting.

16 Claims, 15 Drawing Sheets

(51) Int. Cl.

| | | |
|---|---|---|
| *F21V 8/00* | (2006.01) | |
| *F21V 15/01* | (2006.01) | |
| *F21S 8/06* | (2006.01) | |
| *F21V 21/008* | (2006.01) | |
| *F21V 21/04* | (2006.01) | |
| *E04B 9/06* | (2006.01) | |
| *E04B 9/18* | (2006.01) | |
| *G02B 1/04* | (2006.01) | |
| *E04B 9/00* | (2006.01) | |
| *F21Y 115/10* | (2016.01) | |

(52) U.S. Cl.
CPC ......... *G02B 6/0055* (2013.01); *G02B 6/0078* (2013.01); *E04B 9/006* (2013.01); *F21Y 2115/10* (2016.08)

(56) References Cited

U.S. PATENT DOCUMENTS

| | | | |
|---|---|---|---|
| 5,408,363 A * | 4/1995 | Kano | G02B 5/10 359/869 |
| 5,709,460 A * | 1/1998 | Lester | F21S 8/02 362/147 |
| 5,777,857 A * | 7/1998 | Degelmann | F21S 2/00 362/150 |
| 7,392,629 B1 * | 7/2008 | Bankston | E04B 9/006 52/506.07 |
| 8,702,264 B1 * | 4/2014 | Rashidi | F21S 8/026 362/147 |
| 2002/0141181 A1 * | 10/2002 | Bailey | E04B 9/32 362/150 |
| 2008/0087464 A1 * | 4/2008 | Patterson | H01R 25/147 174/70 C |
| 2010/0315833 A1 * | 12/2010 | Holman | G02B 6/0028 362/607 |
| 2011/0175533 A1 * | 7/2011 | Holman | E04B 9/32 315/130 |
| 2013/0294061 A1 * | 11/2013 | Sorensen | F21S 8/06 362/223 |
| 2014/0071665 A1 * | 3/2014 | Huang | F21V 21/04 362/218 |
| 2015/0138779 A1 * | 5/2015 | Livesay | F21S 8/026 362/298 |
| 2017/0082253 A1 | 3/2017 | Sorensen et al. | |

\* cited by examiner

T-BAR LIGHTING ASSEMBLY

RELATED APPLICATIONS

This application claims the benefit of provisional patent application Ser. No. 62/099,089 titled "T-bar Lighting Assembly" filed Dec. 31, 2014.

BACKGROUND

The invention relates to the use of a T-bar integrated with a light fixture as well as being an integral part of the suspended ceiling system for a building or other structure. In drop ceiling environments such as office space and residential homes the t-bar is a support grid that holds ceiling tiles in place in order to form a drop ceiling.

SUMMARY

A lighting assembly is provided which comprises a light fixture in combination with a support grid such as a drop ceiling t-bar. The light fixture can be configured to use a t-bar as the main form of support. The light fixture can be push-fit onto a t-bar or use a clip to join two or more portions of the light fixture to an installed t-bar. The push fit option is a modular shape designed to fit a variety of different t-bars. Clips are designed to attach specific light fixture components to standard t-bar shapes.

The light fixture can also be configured to act as a t-bar itself and provides support for a ceiling tile to rest upon. A ceiling tile resting on the t-bar can be configured to sit flat and in parallel with the other ceiling tiles.

BRIEF DESCRIPTION OF FIGURES

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
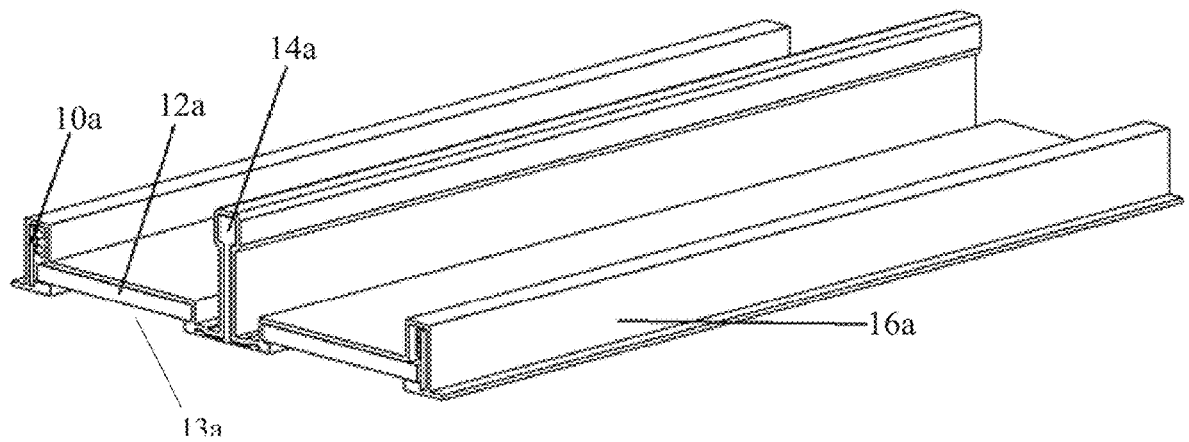
FIG. 1 is a perspective view of "embodiment a" lighting assembly.

FIG. 1 is a perspective view of lighting assembly "embodiment a". A LED board 10a, which serves as a light source, and light guide 12a have been inserted into the housing, extrusion 16a. The conformal shape of the extrusion 16a mates with and is held in place by the t-bar 14a. In this manner, a light fixture (everything in FIG. 1 except the t-bar 14a), can be mounted onto a t-bar 14a without the use of fasteners.

Figure 2A:
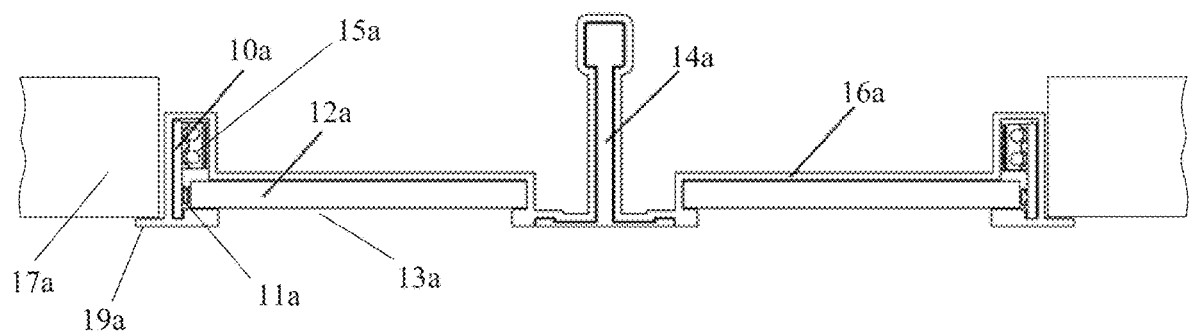
FIG. 2A is a cross-section view of lighting assembly "embodiment a".

FIG. 2A is a cross-section view of lighting assembly "embodiment a". The housing, extrusion 16a, is mated with and supported by the t-bar 14a. This fixture uses an edge lit lighting configuration wherein light from the LEDs 11 on the LED board 10a is input into the edge of the light guide 12a and the output face of the light guide becomes the light emitting surface 13a of the fixture. In a typical embodiment the inside surface of the extrusion 16a will have an optically reflective surface such as a white paint to enhance optical efficiency of the lighting assembly.

"Embodiment a" is a recessed embodiment wherein the housing rests on the t-bar and is mounted flush with a ceiling tile 17a that is supported by a ledge 19a on the edge of the housing. 15a is an electrical connector through which electrical power is distributed to the LED board from a power source such as an LED driver which could be mounted onto the lighting assembly housing or located remotely and connected by wiring.

Figure 3:
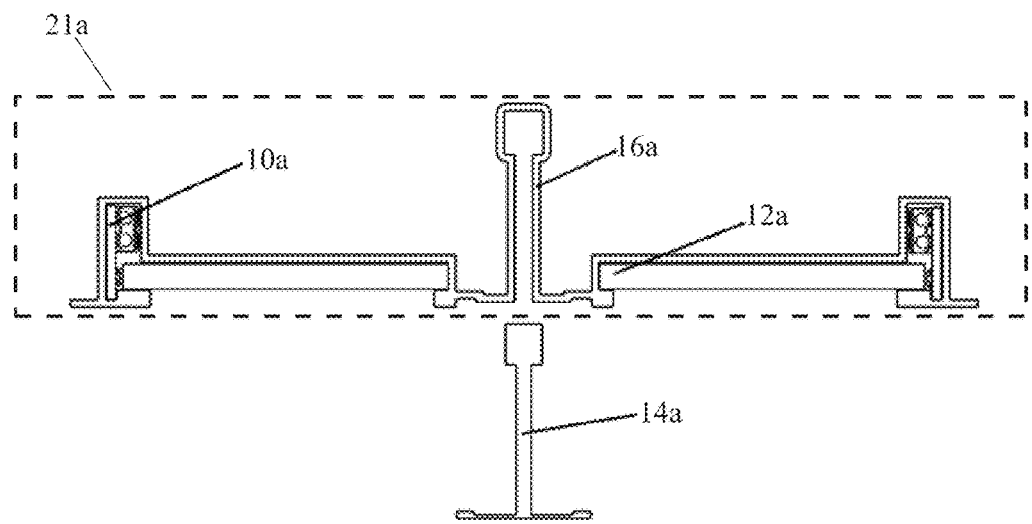
FIG. 3 is a view of the lighting assembly "embodiment a" showing separated light fixture and t-bar.

FIG. 3 is a view of the lighting assembly "embodiment a" wherein the light fixture 21 is shown separated from the t-bar 14a. This view illustrates how the extrusion 16a mimics the shape of the t-bar to create a conformal flush fit. During installation the light fixture 21 attaches to and is supported by the t-bar 14a.

Figure 4:
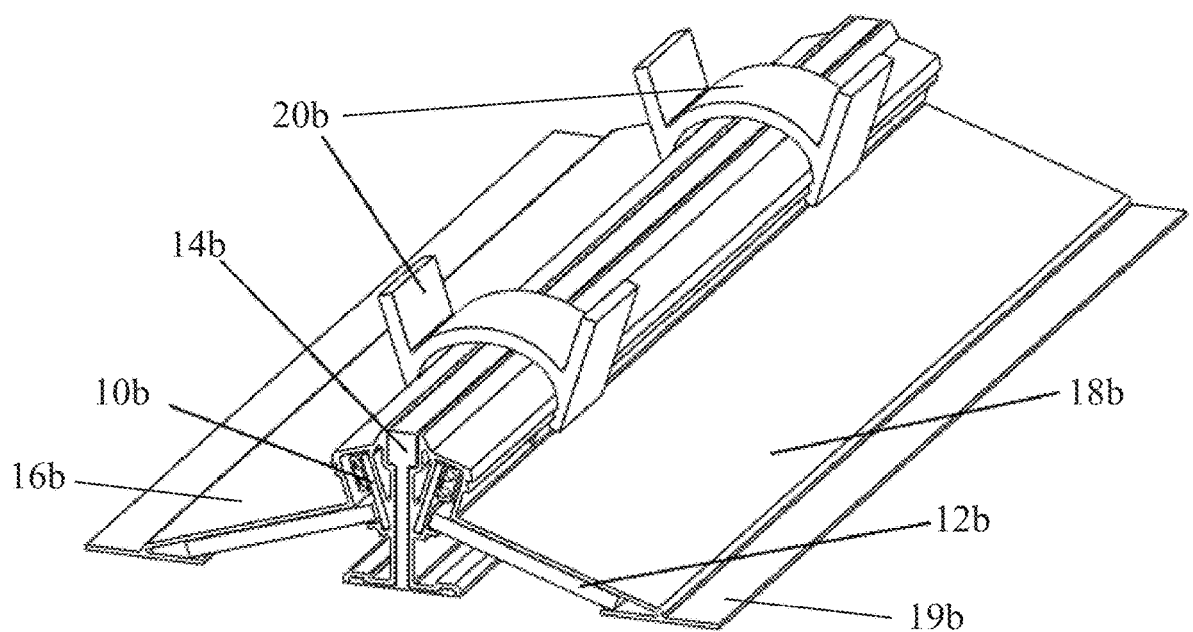
FIG. 4 is a perspective view of a lighting assembly "embodiment b" in which two halves of a light fixture housing are joined onto a t-bar by clips.

FIG. 4 is a perspective view of a lighting assembly "embodiment b" wherein the housing is comprised of two extrusions 16b and 18b which are joined to the t-bar 14b by use of a clip 20b. For an assembled fixture that is 1' long for example, two clips 20b could be used to attach two extrusions together. Here, each extrusion 16b and 18b is fully assembled into light fixture halves then attached at an installation site to an opposing extrusion using clips 20b. For installation, ceiling tile on each side of the assembly can be is cut to mount onto the extrusion ledge 19b.

Figure 5A:
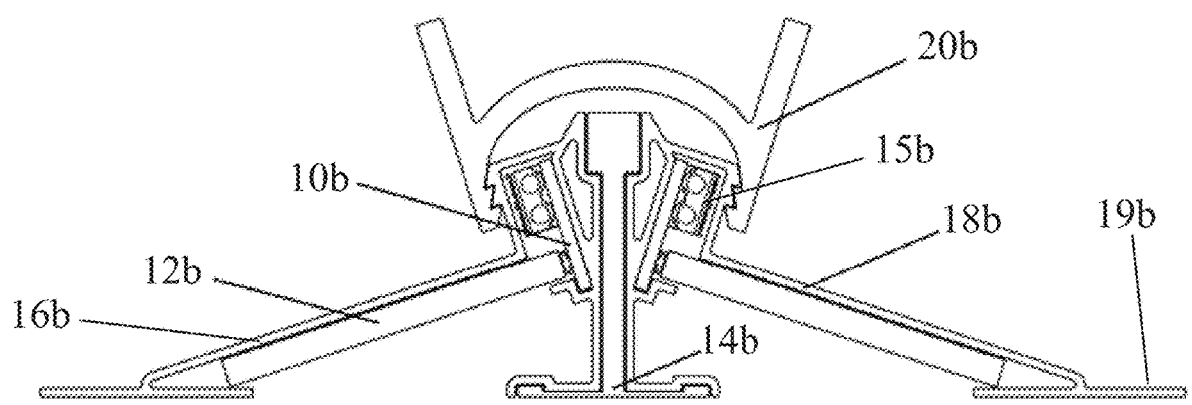
FIG. 5A is a cross-section view of a lighting assembly "embodiment b" in which two halves of a light fixture housing are joined onto a t-bar by clips.

FIG. 5A is a cross-section view of a lighting assembly "embodiment b" wherein the housing is comprised of two extrusions 16b and 18b which are joined to the t-bar 14b by use of a clip 20b. 15b is an electrical connector through which electrical power is distributed to the LED board from a power source such as an LED driver which could be mounted onto the lighting assembly housing or located remotely and connected by wiring.

Figure 6:
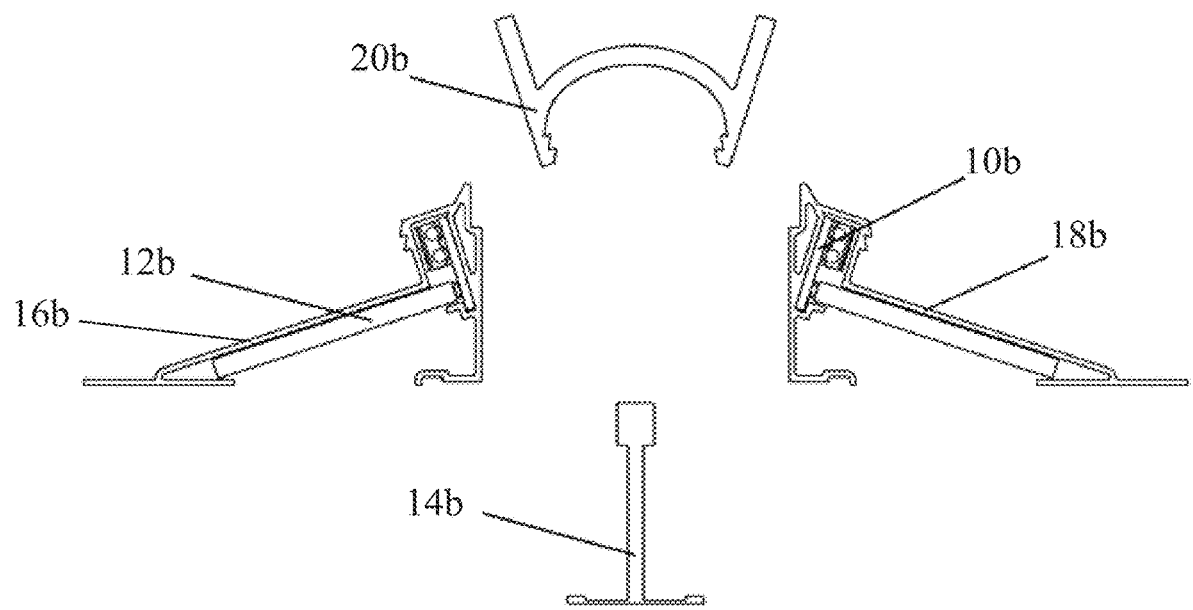
FIG. 6 is a cross-section view of a partially disassembled "embodiment b" lighting assembly.
Figure 7:
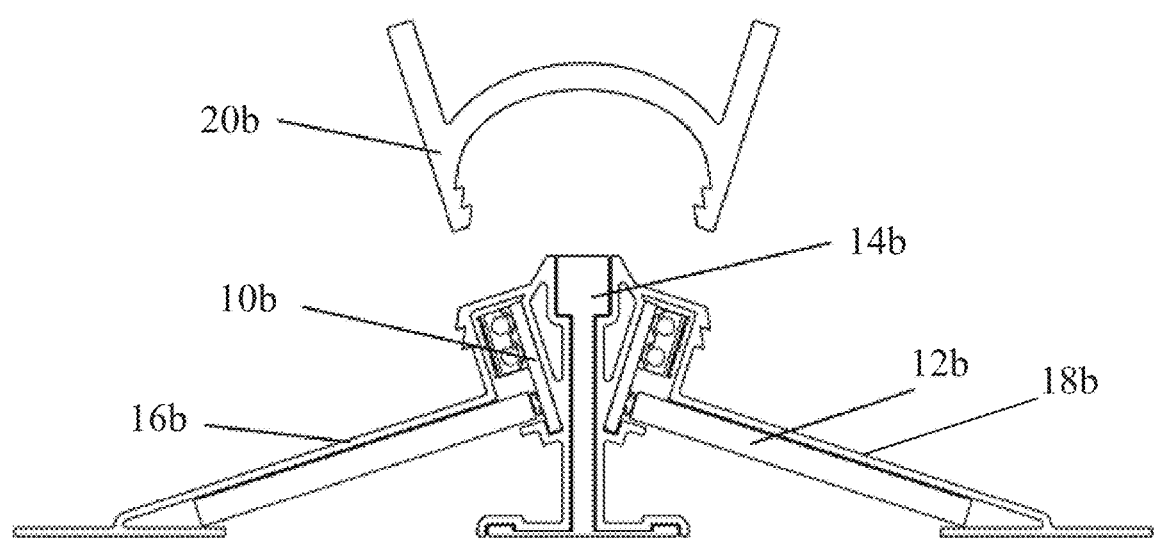
FIG. 7 is a perspective view of a partially disassembled "embodiment b" lighting assembly.

FIG. 6 and FIG. 7 are views of a partially disassembled "embodiment b" lighting assembly which show the separate sections that are assembled into the finished lighting assembly; the two light fixture halves formed from extrusion 16b and 18b, clip 20b, and t-bar 14b. The clip 20b contains small grooves on it to allow for a tight locking fit.

Figure 8A:
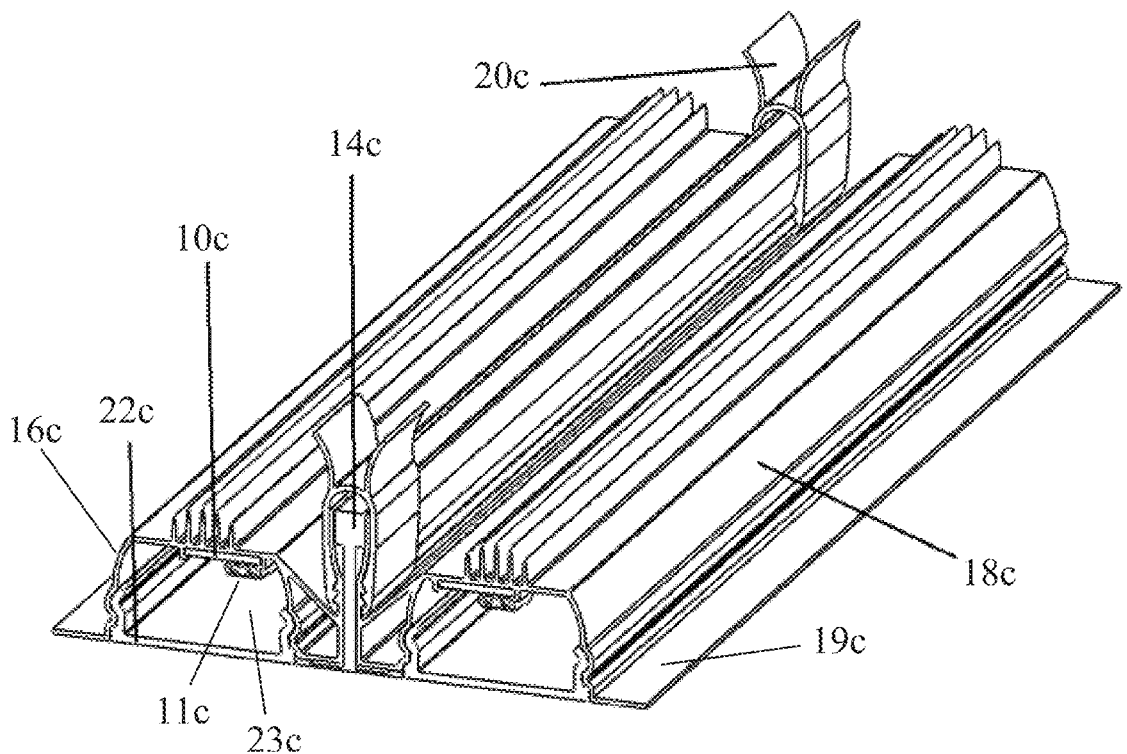
FIG. 8A shows a perspective view of a direct lit lighting assembly "embodiment c".
Figure 8B:
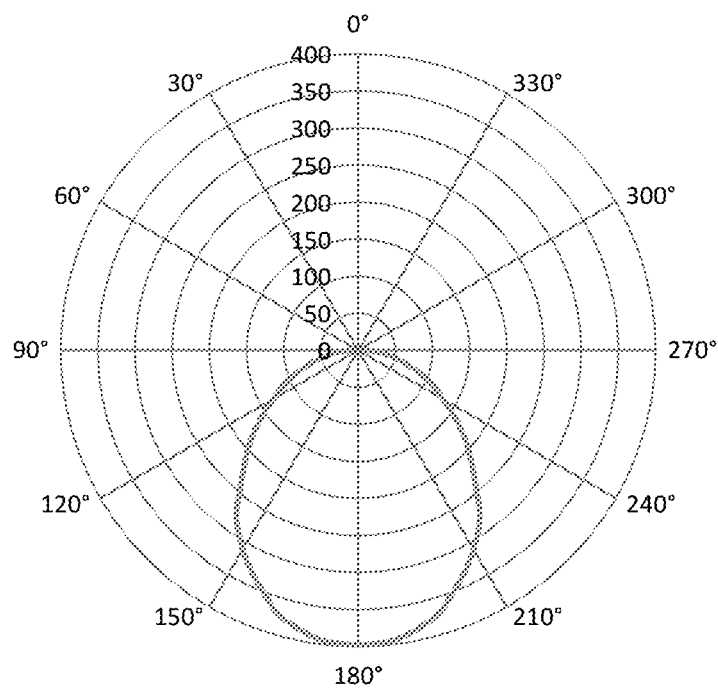
FIG. 8B is a measured light distribution polar plot of the "embodiment c" lighting assembly of FIG. 8A.

Lighting assembly "embodiment c" of FIG. 8A is a direct lit configuration which provides a light distribution with peak intensity normal to the fixture. Two halves of the light fixture, extrusion 16c and extrusion 18c, are joined onto the t-bar 14c, by clips 20c. LEDs 11 populate each LED board 10c from which light is emitted and dispersed into the reflective chamber 23c before exiting the lighting assembly through a diffuser lens 22c. Ledges 19c on both sides of the housing provide a resting place for ceiling tile. In addition to scattering light, a diffusion lens may be used in both direct lit and edge lit optical systems to reduce glare if it contains light directing surface features. Examples include but are not limited to geometric shapes such as half spheres, pyramids, truncated pyramids, lenticulars, and linear prisms.

Figure 2B:
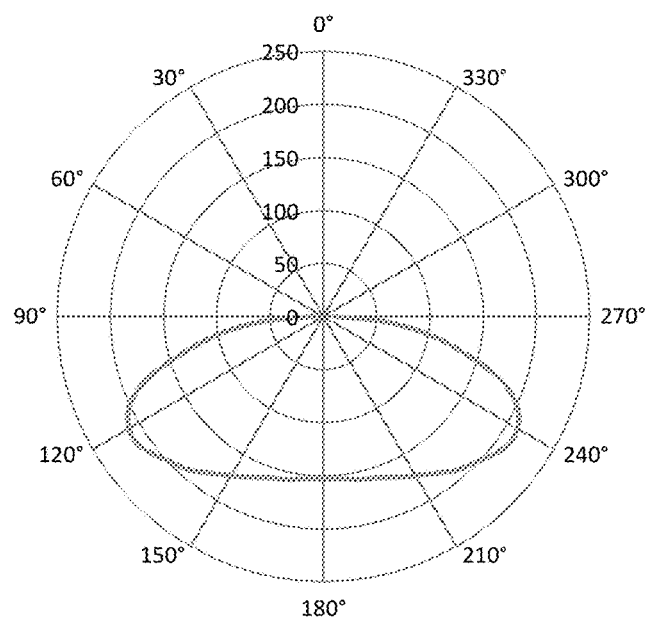
FIG. 2B is a measured intensity vs. angle light distribution polar plot from lighting assembly "embodiment a".
Figure 9A:
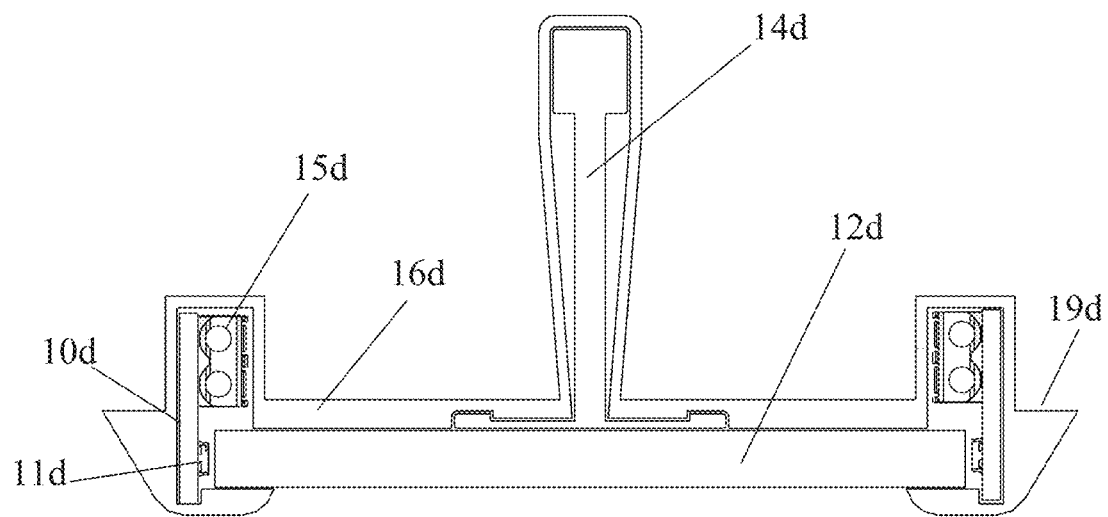
FIG. 9A shows a cross-section view of an edge lit lighting assembly "embodiment d" with a single light guide edge lit from two opposing sides.
Figure 9B:
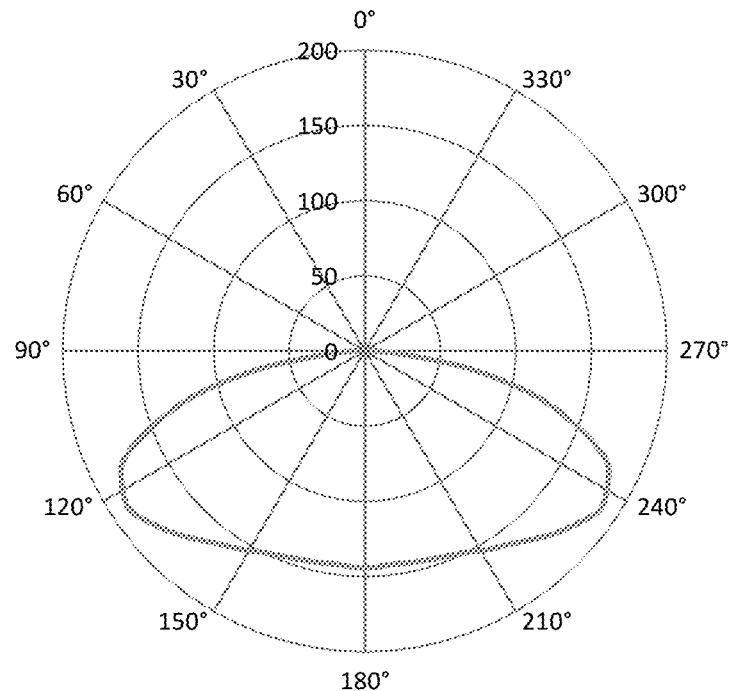
FIG. 9B is a measured light distribution polar plot of the "embodiment d" lighting assembly of FIG. 9A.

Lighting assembly "embodiment d" of FIG. 9A contains a single light guide 12d lit from two opposing edges by LEDs 11d mounted on LED boards 10c and provides a wide angle lobed light distribution similar to the "embodiment a" of FIG. 2 but with more light normal to the fixture. The extrusion 16d serves as a housing which has a t-bar shaped section that conforms to the shape of the t-bar 14d; the two mating together to hold the assembly in place upon the t-bar 14d. Ledges 19d provide support for ceiling tile and power is supplied via electrical connectors 15d.

Figure 10A:
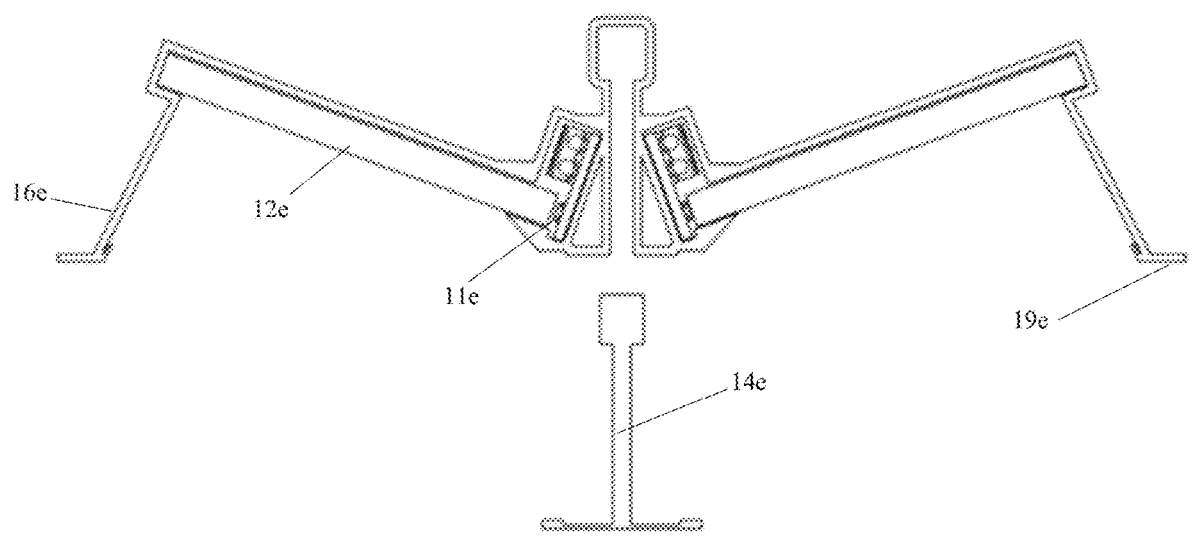
FIG. 10A shows a cross-section view of an edge lit lighting assembly "embodiment e" with angled light guides.
Figure 10B:
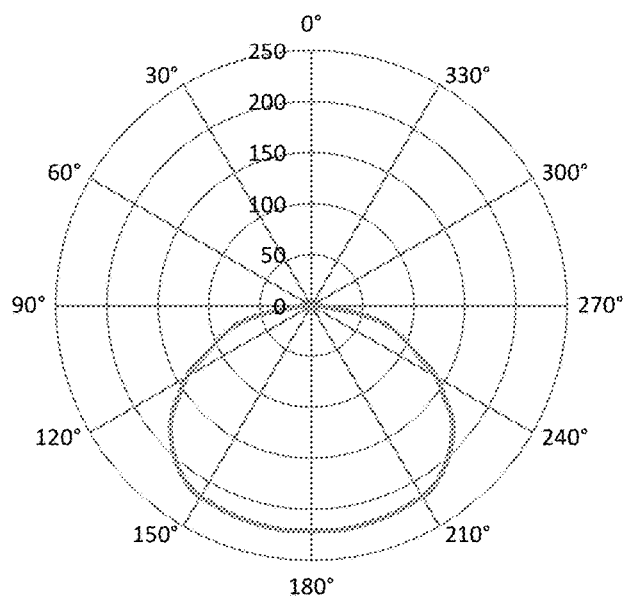
FIG. 10B is a measured light distribution polar plot of the "embodiment e" lighting assembly of FIG. 10A.

Lighting assembly "embodiment e" of FIG. 10A has two light guides 12e, each lit from the inside edge by LEDs 11e and tilted upward which produces a light distribution with even peak intensity over the range±30° from normal as seen in FIG. 10B. The tilted light guides 12e provide for a design in which the side of the extrusion 16e acts as a reflector and baffle in narrowing the light distribution and preventing glare.

Figure 11A:
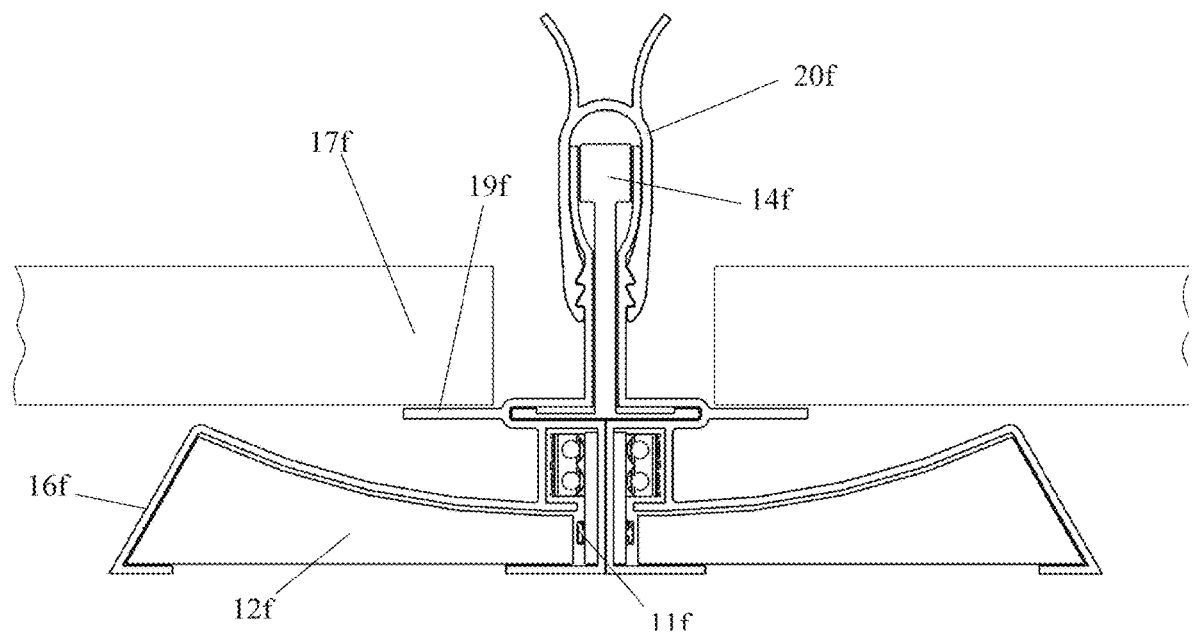
FIG. 11A shows a cross-section view of an edge lit lighting assembly "embodiment f" with two edge lit light guide, each lit from the center edge.
Figure 11B:
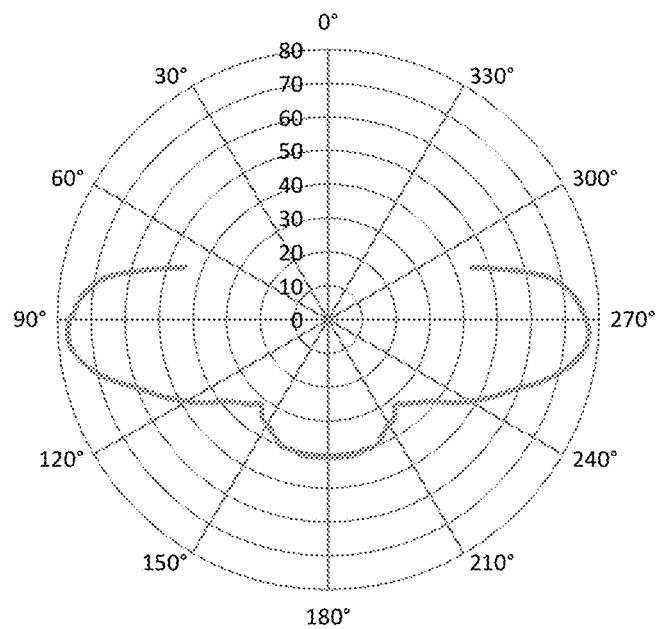
FIG. 11B is a measured light distribution polar plot of the "embodiment f" lighting assembly of FIG. 11A.

The lighting assembly "embodiment f" of FIG. 11A contains two light guides 12f each lit from the inside edge by LEDs 11f and shaped with flared edges that provide an extreme wide angle light distribution with 2 major lobes at ±90° from normal and a weaker minor lobe normal to the fixture. "Embodiment f" is a configuration which is not recessed within the ceiling but rather the significant portion of the housing extrusion 16f is suspended below the ceiling tile 17f which is supported by the ledge 19f. The clip 20f hold the housing extrusion together on the t-bar 14f.

Figure 12:
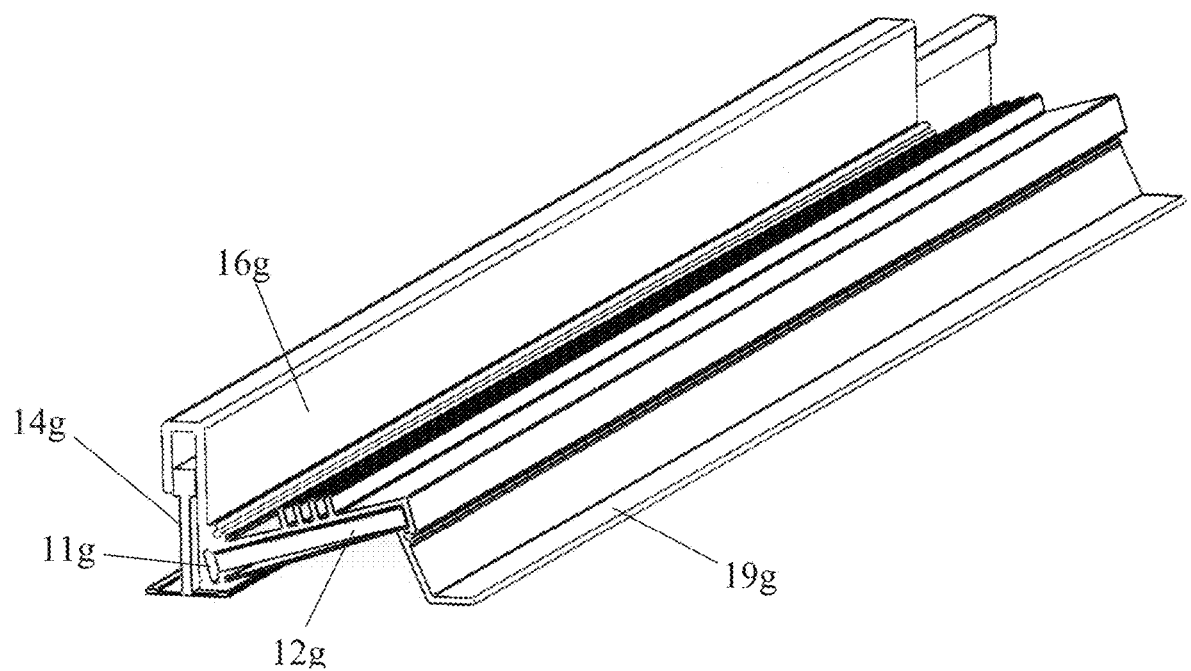
FIG. 12 is a perspective view of an asymmetric lighting assembly "embodiment g" with a single edge lit light guide.
Figure 13A:
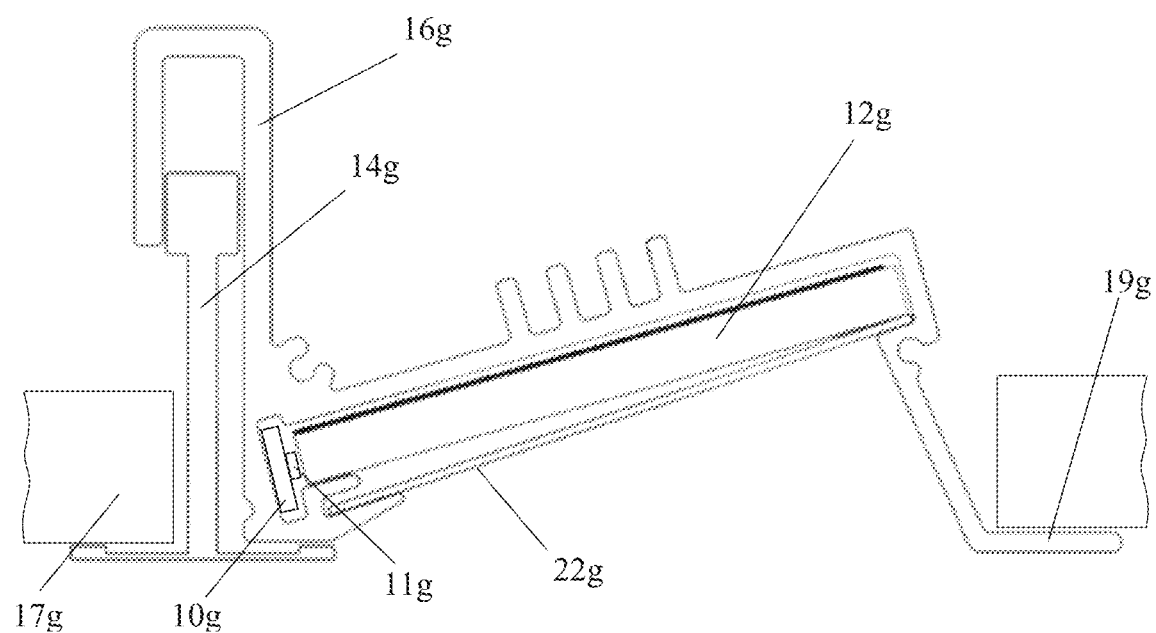
FIG. 13A is a cross-section view of lighting assembly "embodiment g" with a single edge lit light guide.

FIG. 12 is a perspective view of asymmetric lighting assembly "embodiment g" with a single edge lit light guide. The housing extrusion 16g mates with the t-bar 14g which holds it in place. FIG. 13A is a cross-section view of lighting assembly "embodiment g" which details the configuration.

Figure 13B:
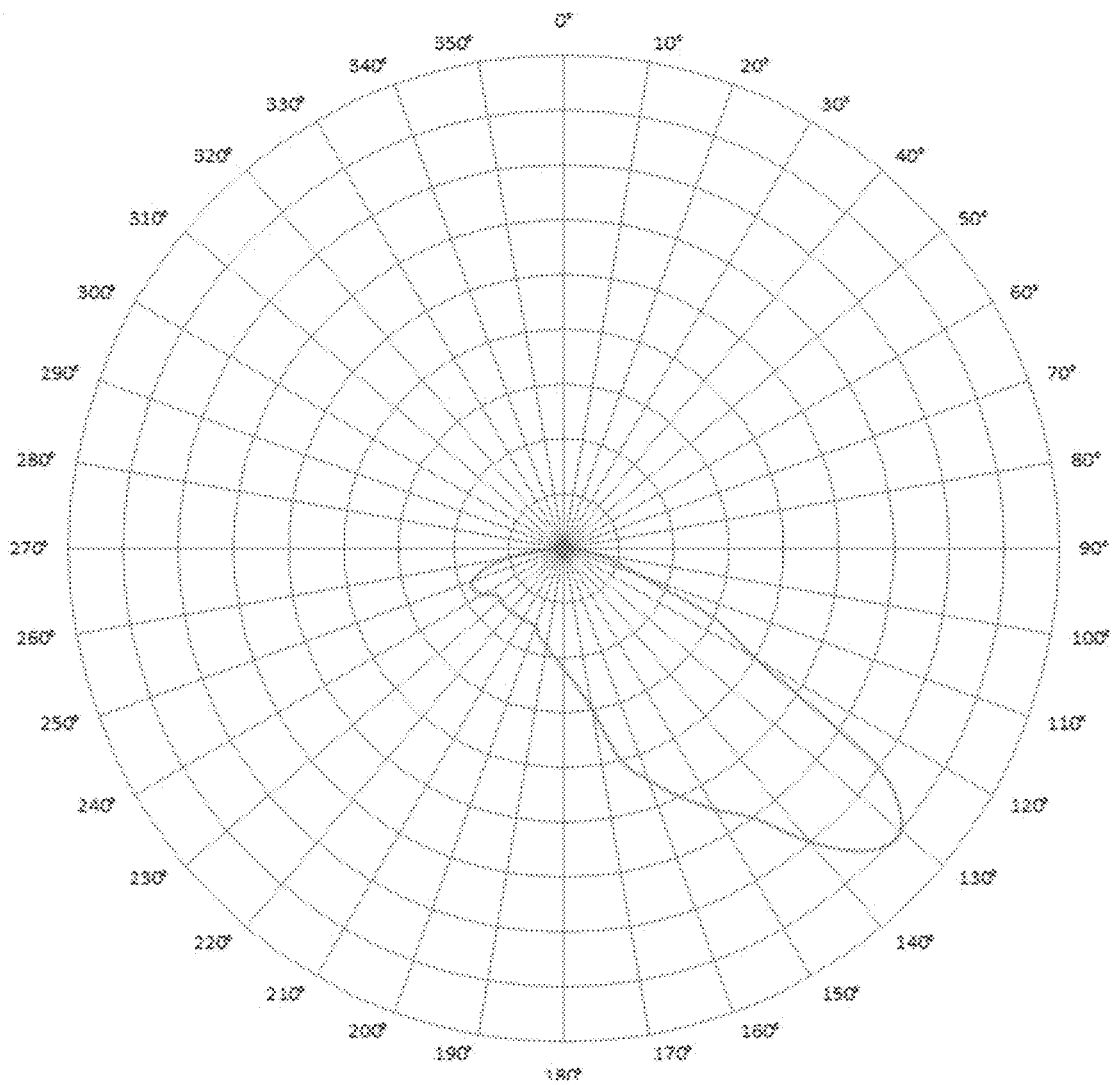
FIG. 13B is a measured light distribution polar plot of the embodiment lighting assembly "embodiment g" of FIG. 13A.
Figure 14:
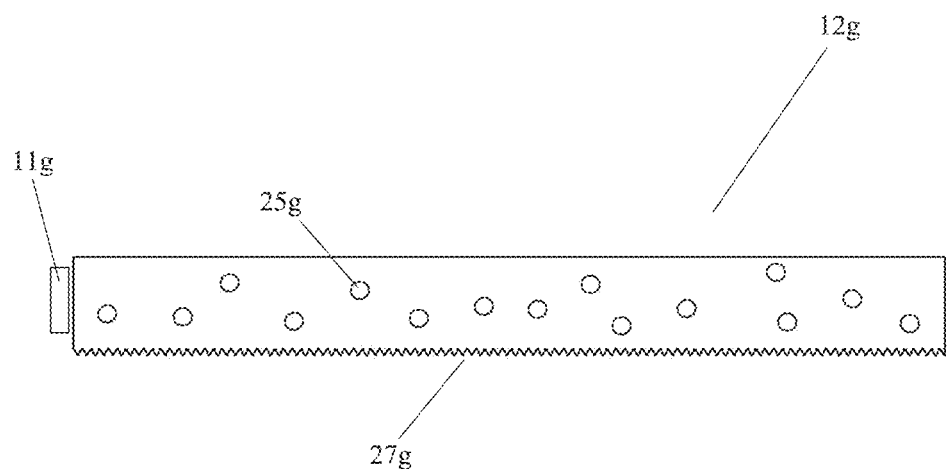
FIG. 14 is a cross-section view of "embodiment g" light guide having a light diffusing volume and light directing features.

FIG. 13A is a cross-section view of lighting assembly "embodiment g" with a single edgelit light guide. Both the fixture mechanical design and the light output distribution in FIG. 13B polar plot of intensity vs. angle are asymmetric making this embodiment optimal for applications such as wall washing, wall grazing, and cove lighting. The ledge 19g of the housing extrusion 16g supports ceiling tile 17g in a recessed ceiling fit. Light from LEDs 11g on the LED board 10g is input into the light guide 12g and then propagates through the diffusing lens 22g before exiting the lighting assembly. The diffusing lens 22g is slightly angled with respect to the light guide to provide some offset distance near the input side to improve the spatial uniformity of light distribution but closer to the light guide 12h near the opposing edge to increase optical efficiency. Alternatively, the diffusing lens 22g could be a component with light directing surface features to reduce glare and/or change light distribution patterns. FIG. 14 illustrates optical detail of the "embodiment g" light guide 12g which is primarily polymethyl methacrylate (PMMA) but contains a <2% concentration of polymer microbeads 25 having a refractive index differing from that of the bulk PMMA, thus producing a volumetric diffuser and inducing some light scattering and helping to out couple light from the light guide. The light guide 12g also consists of light directing surface features 27 in the specific form of linear ridges located on the output face which act to produce light outcoupling and the specific light distribution seen if FIG. 13B. As an alternative to polymer microbeads for producing volumetric diffusion, other micro-regions of differing refractive index could be utilized to induce light scattering. Examples include white reflective powders such as Ti02 or micro-regions of differing refractive index formed by immiscible blending of polymer materials.

Figure 15:
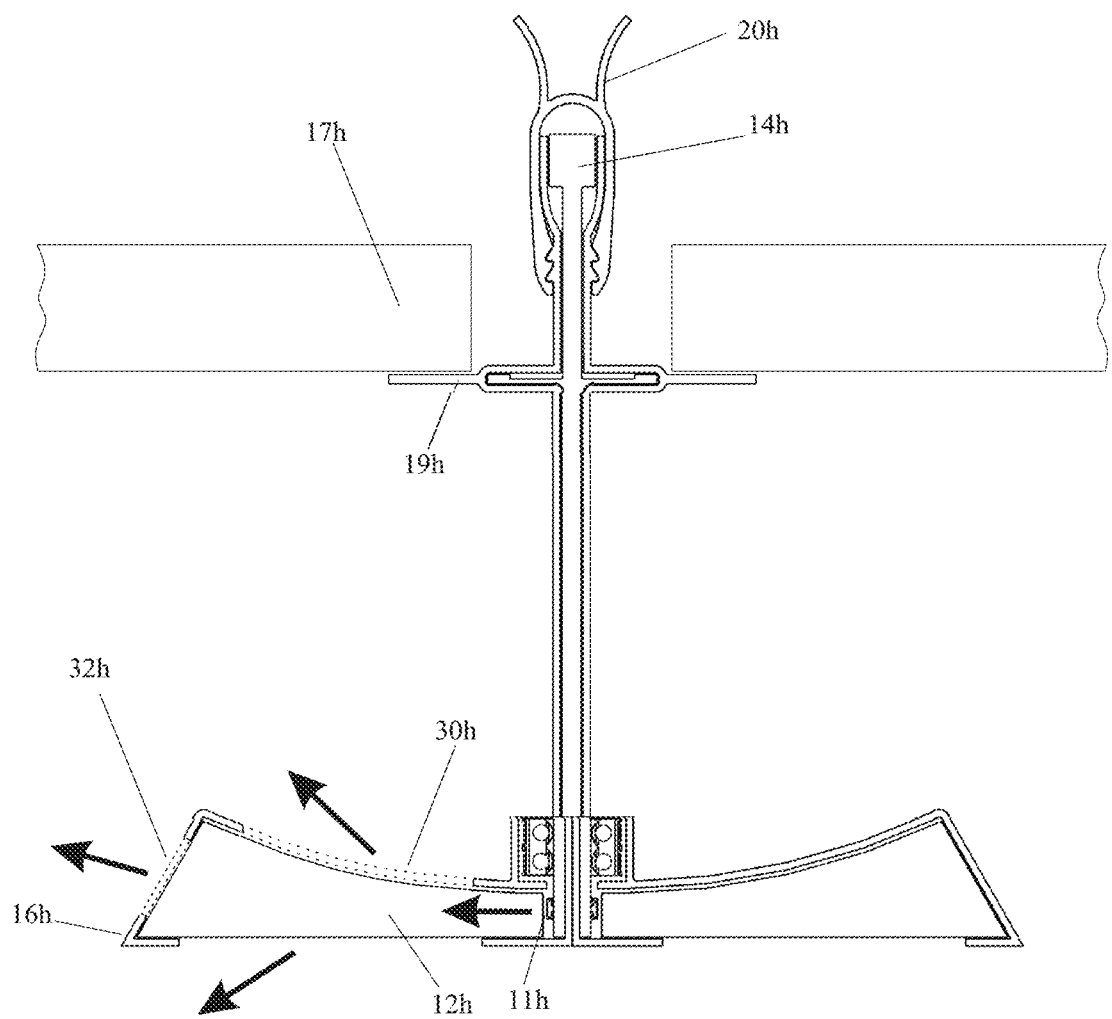
FIG. 15 is a cross-section view of lighting assembly "embodiment h", with suspended light fixture.

FIG. 15 is a cross-section view of lighting assembly "embodiment h" in which the light fixture portion of the assembly is suspended below the ceiling tile 17h by means of an extended housing. Alternatively, the bottom portion of the housing could be suspended by cable connected to the upper portion. The housing 16h is mated to the t-bar 14h to hold the lighting assembly in place. A ledge 19h supports ceiling tile 17h. Light from LEDs 11 enters the input edge of the light guide and is propagated within the light guide with some light exiting bottom, top, and side of the housing 16h. Portions of light exiting through the top and side exit through though the top aperture 30h and side aperture 32h respectively. In this way a suspended direct/indirect light fixture integrated with a ceiling t-bar can be achieved. The multiple paths of light propagation are illustrated in FIG. 15 with arrows.

FIG. 2B, FIG. 5B, FIG. 8B, FIG. 9B, FIG. 11B, FIG. 11B, and FIG. 13B show measured intensity vs. angle light distribution polar plots of embodiment lighting assemblies of FIG. 2A, FIG. 5A, FIG. 8A, FIG. 9A, FIG. 10A, FIG. 11A, and FIG. 13B respectively and illustrate some of the wide range of light distributions possible with various embodiment configurations. The two light guides in the embodiment of FIG. 2A, each lit from the outside edge, provide a fairly wide light distribution with higher intensity lobes centered at approximately ±60° from normal (straight down for a ceiling mounted fixture).

Figure 5B:
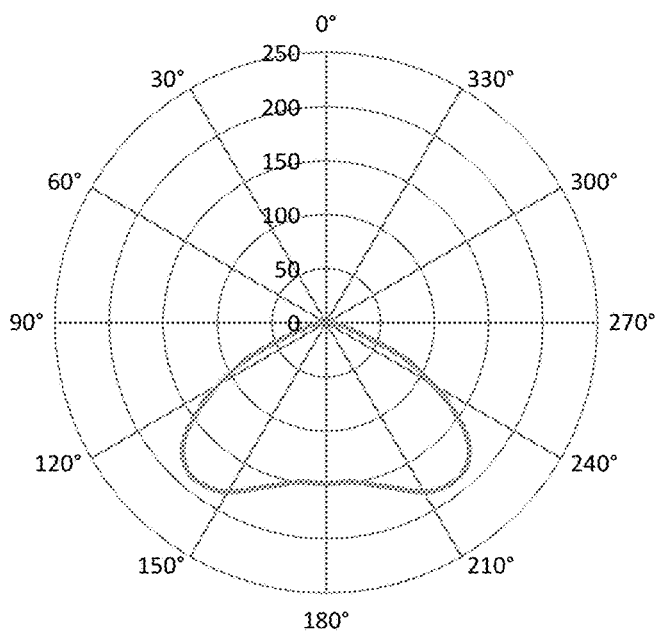
FIG. 5B is a measured intensity vs. angle light distribution polar plot from lighting assembly "embodiment b".

The embodiment of FIG. 5A has two light guides, each lit from the inside edge and tilted to narrow the light distribution and provide higher intensity lobes at approximately ±40° from normal (straight down for a ceiling mounted fixture). A light distributions such as that shown in FIG. 5B is commonly referred to as bat wing light distribution and is considered very desirable in many illumination applications where the illuminance field projected onto a flat surface from an overhead light fixture is optimally uniform in intensity. The lobes in the light distribution facilitate this by projecting more light off axis from the light fixture to compensate for the greater distance needed to reach the illuminated surface at angles away from normal directly below the fixture.

Embodiments "b" and "e" shown in FIG. 5A/5B and FIG. 10A/10B illustrate that changing the orientation of light guides changes the output light distribution. By providing means for tilting light guides within the lighting assembly, a lighting assembly of adjustable light distribution can be produced. Furthermore, addition of electronics capable of receiving a control signal and an electromechanical motor can be used to remotely adjust the light distribution. When mounted into a room ceiling, embodiment lighting assemblies can provide adjustment of light distribution without noticeable change from an observer within the room.

In general, embodiments of have been shown to provide a wide variety of non-lambertian light distributions that are typically valued in illumination applications.

Figure 16:
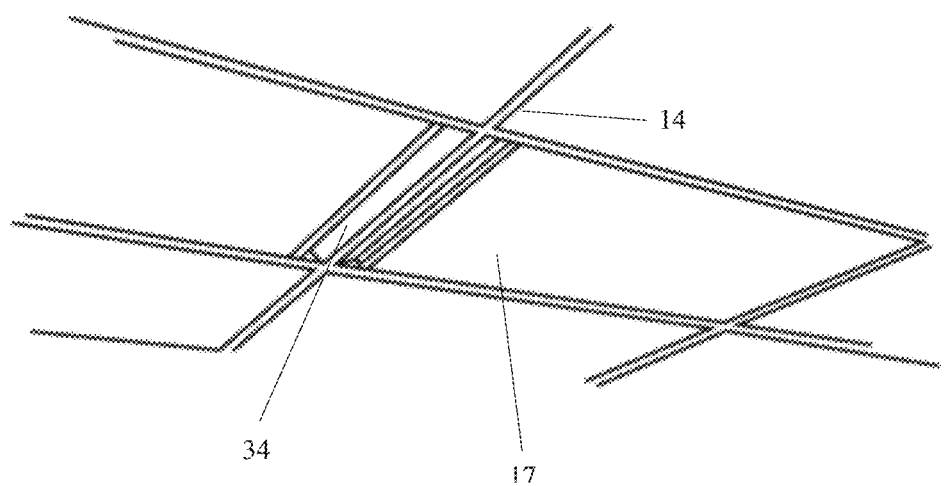
FIG. 16 is an underneath perspective view of an example t-bar lighting assembly installation from within a room looking up at the ceiling.

FIG. 16 is an underneath perspective view of an example t-bar lighting assembly installation from within a room looking up at the ceiling. A t-bar lighting assembly 34 is mounted onto a t-bar 14 flush with the ceiling tile 17.

Figure 17:
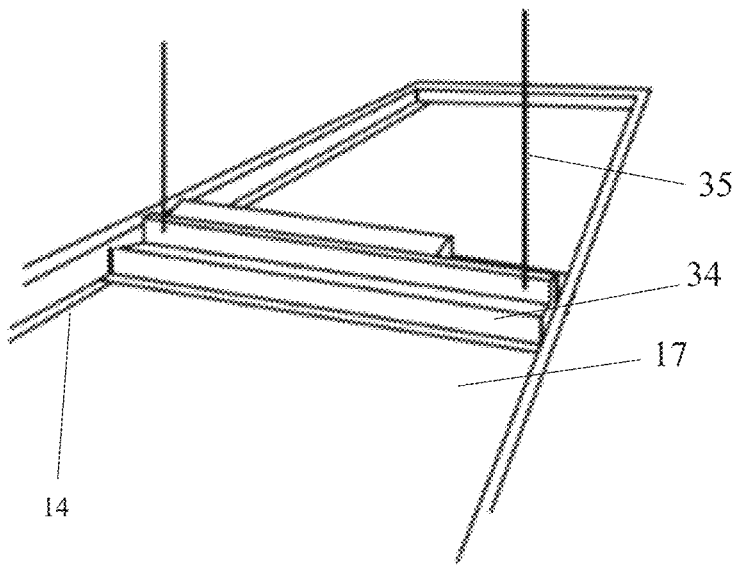
FIG. 17 is an overhead perspective view of a t-bar lighting assembly from above a t-bar grid within a ceiling cavity.

FIG. 17 is an overhead perspective view of a t-bar lighting assembly from above a t-bar grid within a ceiling cavity. A t-bar lighting assembly 34 is mounted onto a t-bar grid (mounting t-bar not visible but adjacent t-bar 14 shown). An optional suspension cable is shown which can be used for extra support and is required by building code in some installation situations.

LIST OF NUMERICAL REFERENCES (Suffix a-h added in detailed description section to indicate specific embodiment)
10 LED board
11 LED
12 light guide
13 light emitting surface
14 t-bar
15 electrical connector
16 extrusion/housing
17 ceiling tile
18 extrusion
19 ledge (of housing/extrusion)
20 clip a
21 light fixture
22 diffusing lens
23 reflective cavity
25 polymer microbeads
27 light directing surface features
30 top aperature
32 side aperature
34 t-bar lighting assembly
35 suspension cable

What is claimed is:
1. A lighting assembly comprising;
a T-bar having a vertical portion and a horizontal portion extending along a length of the T-bar parallel to a longitudinal axis of the T-bar;
first and second light sources, each light source comprising at least one LED and a light guide; and
a housing supporting the first and second light sources, the first and second light sources being housed by the housing, wherein the housing includes:
a central section disposed above the horizontal portion of the T-bar mated to the T-bar such that the housing is supported by the T-bar,
first and second light source supporting sections coupled to the central section and located on opposite sides of the T-bar, wherein each of the first and second light source supporting sections extends from a respective first side proximate the T-bar to a respective second side spaced apart from the T-bar, and wherein each of the first and second light source supporting sections supports a respective one of the first and second light sources between the first and second sides of the respective light source supporting section such that an output face of each of the light guides is oriented at an oblique angle to the horizontal portion of the T-bar with the output face of each of the light guides being lower at the first side of the respective light source supporting section than at the second side of the respective light source supporting section, and
first and second ledges disposed on the opposite sides of the T-bar for supporting first and second ceiling tiles on the opposite sides of the T-bar, the first ledge extending from the second side of the first light source supporting section and away from the T-bar such that the first ledge is disposed on a side of the first light source supporting section opposite the central section, and the second ledge extending from the second side of the second light source supporting section and away from the T-bar such that the second ledge is disposed on a side of the second light source supporting section opposite the central section,
wherein the central section and first and second ledges of the housing extend along the length of the T-bar parallel to the longitudinal axis of the T-bar, and
wherein the central section has a profile shaped to fit over and around the vertical portion of the T-bar.

2. The lighting assembly of claim 1, wherein the T-bar is part of a ceiling grid.

3. The lighting assembly of claim 1, wherein the first and second light sources are recessed within a ceiling cavity.

4. The lighting assembly of claim 1, wherein the first and second light sources are configured to produce non-lambertian light output.

5. The lighting assembly of claim 1, further comprising first and second diffusers associated with the first and second light sources.

6. The lighting assembly of claim 1, wherein the housing is an extruded shape.

7. The lighting assembly of claim 1, wherein the housing is a unitary extruded shape and is mounted to the T-bar in an operable configuration without fasteners or brackets.

8. The lighting assembly of claim 1, wherein light from each of the at least one LEDs is input into an edge of the associated light guide, the edge extending adjacent and parallel to the horizontal portion of the T-bar.

9. The lighting assembly of claim 1, wherein each light guide is comprised of a volumetric diffuser or comprises light directing surface features.

10. The lighting assembly of claim 1, further comprising first and second diffusing lenses through which light is transmitted after exiting the light guides.

11. The lighting assembly of claim 1, wherein the central section of the housing is formed from a single body and the profile of the central section generally matches a profile of the T-bar.

12. A lighting assembly comprising;
a first light source comprising one or more LEDs and a light guide; and
a housing, the first light source being housed by the housing, the housing including:
a longitudinally extending central section configured to couple to a T-bar of a suspension ceiling to support the housing when fitted to the T-bar,
a light source supporting section coupled to the central section, wherein the light source supporting section extends from a first side adjacent the central section to a second side spaced apart from the central section, the first light source supporting section supporting the first light source between the first and second sides of the light source supporting section such that, when the housing is coupled to the T-bar, a light emitting surface of the light guide is oriented at an oblique angle to a horizontal portion of the T-bar with the light emitting surface of the light guide being lower at the first side of the light source supporting section than at the second side of the light source supporting section, and
a ledge for supporting a first ceiling tile, the ledge extending from the second side of the light source supporting section and away from the T-bar such that the ledge is disposed on a side of the light source supporting section opposite the central section,
wherein, when the central section is coupled to the T-bar, the second side of the light source supporting section is a greater distance from the T-bar than is the first side.

13. The lighting assembly of claim 12, wherein the housing includes first and second separately formed portions configured for coupling on opposite sides of the T-bar and a fastener for coupling the portions to one another.

14. The lighting assembly of claim 12, wherein the housing further includes an elongation extending between the light source supporting section and the ledge, the elongation oriented at an oblique angle relative to the horizontal portion of the T-bar.

15. The lighting assembly of claim 12, further comprising a diffuser associated with the light guide.

16. The lighting assembly of claim 15, wherein the diffuser is oriented at an oblique angle with respect to an output face of the light guide.

* * * * *